United States Patent Office 3,398,205
Patented Aug. 20, 1968

3,398,205
OLEFIN ISOMERIZATION PROCESS
Sterling F. Chappell, Lake Charles, and Reginald F. Clark, Baton Rouge, La., assignors to Columbian Carbon Company, New York, N.Y., a corporation of Delaware
No Drawing. Filed Sept. 20, 1965, Ser. No. 488,798
7 Claims. (Cl. 260—666)

ABSTRACT OF THE DISCLOSURE

A process for the isomerization of an ethylenically unsaturated aliphatic hydrocarbon to a more thermodynamically stable isomeric form which is catalyzed by a heavy metal carbonyl. Carbon monoxide is maintained at a partial pressure low enough to permit the decomposion of the heavy metal carbonyl catalyst, yet high enough to prevent the catalyst from decomposing at an uncontrolled rate.

---

The present invention relates to a process for the isomerization of unsaturated aliphatic hydrocarbons to more thermodynamically stable isomers thereof. In a more specific aspect, the invention provides an effective process for isomerizing cycloalphatic diene hydrocarbons using heavy metal carbonyl catalysts.

The use of an iron carbonyl catalyst to isomerize 1,5-cyclooctadiene to 1,3-isomer has been described in an article by J. E. Arnet and R. Pettit appearing in the "Journal of the American Chemical Society," vol. 83, page 2954 (1961). In accordance with this reported reaction, 10.0 grams of iron pentacarbonyl are heated with 100.0 grams of 1,5-cyclooctadiene at 115° C. for seven hours at atmospheric pressure. That process, however, requires unduly long reaction periods and large quantities of catalyst. These disadvantages in the reported process are apparently due to the iron pentacarbonyl catalyst decomposing at an uncontrolled rate to iron and carbon monoxide.

It has also been reported that the isomerization of certain unsaturated alcohols may be conducted in the presence of cobalt carbonyl catalyst under sufficient carbon monoxide pressure to prevent decomposition of the cobalt carbonyl at the prevailing reaction temperature. However, a process of this type, wherein the partial pressure of carbon monoxide is maintained above the decomposition pressure of cobalt carbonyl (i.e. the pressure developed by the decomposition of cobalt carbonyl to cobalt and carbon monoxide), is not entirely suitable for the isomerization of unsaturated hydrocarbons in that the reaction rates, as well as the yields of the more stable isomer, are low.

In accordance with our present invention, a process is provided which enables the use of low concentrations of heavy metal carbonyl catalysts to effect the isomerization of unsaturated aliphatic hydrocarbons to their more thermodynamically stable isomeric forms. Furthermore, the isomerization reaction provided by the invention proceeds at a rapid rate and results in a high yield of product. Since the present process utilizes relatively moderate pressures, it is not necessary to use high pressure reactors which are required in certain isomerization reactions, such as the isomerization of unsaturated alcohols noted above.

These and other objects and advantages of the invention as will become apparent from the following detailed description thereof are accomplished by contacting the unsaturated aliphatic hydrocarbon with a heavy metal carbonyl compound and decomposing the carbonyl compound in a carbon monoxide atmosphere at elevated pressure. Thus, an important feature of this invention is that the partial pressure of carbon monoxide is below that required to prevent the decomposition of heavy metal carbonyl catalyst at the prevailing reaction temperature, but is high enough to prevent the catalyst from decomposing at an uncontrolled rate. As a result, the isomerization reaction proceeds by a more or less controlled decomposition of the metal carbonyl catalyst and by the formation of some catalytic species which is stabilized by the moderate carbon monoxide pressure employed.

The unsaturated aliphatic hydrocarbons isomerized to their thermodynamically more favored isomers in accordance with the present invention can be linear, branched-chain or cyclic and may contain one, two or more sites of ethylenic unsaturation. Multi-unsaturated aliphatic hydrocarbons, wherein there is at least one hydrogen-bearing carbon atom positioned between the double bonds, and particularly cycloaliphatic hydrocarbons of this type containing from about six to about twelve ring carbon atoms, are particularly preferred. Illustrative of the isomerization reactions that may be effected by the present process are 1,5-cyclooctadiene to 1,3-cyclooctadiene; 1,3-cyclononadiene to 1,5-cyclononadiene; 1,3-cyclodecadiene to 1,6-cyclodecadiene; 1,5-cyclododecadiene to 1,3-cyclododecadiene and 1,5-hexadiene to a mixture of 1,3-hexadiene and 2,4-hexadiene. The present process may also be used to isomerize the geometric configuration of unsaturated aliphatic hydrocarbons. Illustrative of such reactions is the isomerization of a mixture of 90% cis–10% trans cyclooctene-1 to substantially 100% cis-isomer.

The heavy metal carbonyl employed as the catalyst may be represented by the formula $M_x(CO)_y$, wherein M is preferably a metal from Groups VI through VIII of the Periodic Table and $x$ and $y$ are the coordination numbers of the metal carbonyl. Illustrative metal carbonyl catalysts of this type are: $Cr(CO)_6$; $Ru(CO)_5$; $Os(CO)_5$; $Ir_2(CO)_8$; $Os_2(CO)_9$; $Ru_2(CO)_9$; $Ru_3(CO)_{12}$; $Mn_2(CO)_{10}$; $Fe(CO)_5$; $Fe_2(CO)_9$; $Fe_3(CO)_{12}$; $Co_2(CO)_8$; $Co_4(CO)_{12}$ and the like. The Group VIII metal carbonyls, and especially the iron and nickel carbonyls, are particularly desirable catalysts for the purposes of the invention.

The amount of heavy metal carbonyl catalyst employed in the practice of the invention may, with advantage, range from about 0.1 to about 10% by weight of the unsaturated aliphatic hydrocarbon. Catalyst concentrations higher than 10% may be used, if desired, but offer no particular advantage over lesser concentrations. For most of the isomerization reactions contemplated by the present invention, catalyst concentrations within the range of from 0.5 to about 2.0%, by weight, of the hydrocarbon are preferred. For instance, in the isomerization of 1,5-cyclooctadiene to 1,3-cyclooctadiene, particularly outstanding product yields and high reaction rates are obtained using from about 0.8 to about 1.5% of catalyst by weight of 1,5-cyclooctadiene.

As previously noted, it is an important feature of the present invention that the isomerization reaction is conducted under conditions such that the heavy metal carbonyl catalyst is permitted to decompose at a controlled rate. For this purpose the reaction is conducted in an atmosphere of carbon monoxide at a pressure which is elevated, but which is not greater than that which will prevent the decomposition of the heavy metal carbonyl at the reaction temperature employed. It will be appreciated that the partial pressure of carbon monoxide which will permit the controlled decomposition of the heavy metal carbonyl will vary for each set of reaction conditions and depends, inter alia, upon temperature, catalyst concentration and the stability of the heavy metal carbonyl. However, as a general rule, it has been found that when the reaction temperature is within the range of from about 90° C. to about 300° C., the desired controlled decomposition of the heavy metal carbonyl catalyst may be effected by regulating the partial pressure of carbon monoxide within the range of from about 5 to about 400 p.s.i.g. and preferably within the range of from about 15 to about 100 p.s.i.g. For instance, when it is desired to produce 1,3-cyclooctadiene by isomerizing 1,5-cyclooctadiene in the presence of iron pentacarbonyl, the reaction temperature may be elevated between about 130° C. to about 250° C., while the partial pressure of carbon monoxide may be regulated within the range of from about 15 p.s.i.g. to about 50 p.s.i.g. with excellent results. The highest reaction temperature which may be employed within the above-noted ranges is determined, of course, by the temperature at which the unsaturated aliphatic hydrocarbon starting material or its isomer undergoes decomposition or thermal rearrangement.

Thus, the present invention utilizes the controlled decomposition of heavy metal carbonyl catalyst in a carbon monoxide atmosphere to obtain fast reaction rates and high yields of a thermodynamically more favored isomer of an unsaturated aliphatic hydrocarbon. As noted above, when the partial pressure of carbon monoxide is excessive, the controlled decomposition of heavy metal carbonyl contemplated herein is not achieved, and the reaction rates and product yields are low. On the other hand, when the isomerization reaction is carried out in the absence of carbon monoxide pressure, e.g., under atmospheric pressure, large quantities of the catalyst are consumed, and reaction rates are low.

The isomerization of unsaturated aliphatic hydrocarbons in accordance with the invention proceeds by decomposition of the metal carbonyl catalyst and by formation of some catalytic species which is stabilized by the moderate carbon monoxide pressure. For instance, in the iron pentacarbonyl-catalyzed conversion of 1,5-cyclooctadiene to the 1,3-isomer, the reaction mechanism is a predominantly psuedo-first order reversible reaction with respect to the disappearance of 1,5-isomer and the appearance of the 1,3-isomer, as long as an appreciable amount of iron pentacarbonyl is available for decomposition. As the iron pentacarbonyl decomposes, a second catalytic species is formed which catalyzes the reaction by a predominantly pseudo-zero order reversible reaction. Atlhough the identity of this catalytic species is not known, it is believed to be an olefin-iron tricarbonyl complex.

In the practice of the present process an admixture of metal carbonyl catalyst and the unsaturated catalytic hydrocarbon to be isomerized may be heated to a suitable temperature in a sealed vessel evacuated of air. After the partial pressure of carbon monoxide has increased to some predetermined level, the pressure may be gradually reduced. According to one preferred embodiment of the invention, after an initial increase of the partial pressure of carbon monoxide to a value of from about 15 p.s.i.g. to about 50 p.s.i.g. at a reaction temperature of from about 130° C. to about 250° C., the pressure is gradually reduced by at least 5 p.s.i.g. during a reaction period of from about 10 minutes to about 24 hours. Alternatively, the pressure of carbon monoxide within the reaction vessel may be adjusted to a suitable level prior to heating the aliphatic hydrocarbon and the metal carbonyl catalyst, and then gradually reduced to regulate the rate at which the catalyst is decomposed. The process may also be carried out in a constant or gradually increasing carbon monoxide pressure, provided, of course, that the carbon monoxide pressure does not exceed that which would prevent the particular metal carbonyl catalyst employed from decomposing.

The following specific examples are presented to illustrate the invention and are not to be interpreted as being limitative of the scope.

EXAMPLE 1

A 300 ml. stainless steel stirred autoclave is charged with 150 g. of 1,5-cyclooctadiene and 1 ml. (about 1.4 g.) of $Fe(CO)_5$. The reactor is sealed, evacuated of air and stirring and heating are commenced. After 27 minutes the reaction temperature is observed to rise to 200° C. where it is maintained for 4¾ hours. The carbon monoxide pressure is observed to rise to 85 p.s.i.g. after 40 minutes at 200° C. and is maintained at that level for 3 hours. The pressure is then reduced to 25 p.s.i.g. in 5 p.s.i. increments every 5 minutes. The product obtained is found by gas chromatography analysis to consist of 1,3-cyclooctadiene 93.4%; 1,4-cyclooctadiene 1.3%; 1,5-cyclooctadiene 0.4%; back-flush 1.0%; other 3.0%. The major constituent of the product, 1,3-cyclooctadiene, is useful as a solvent for paraffinic substances and as an intermediate in the preparation of various chemicals. For instance, 1,3-cyclooctadiene takes part in polymerizations, epoxidations, Diels-Alder reactions, oxidations and miscellaneous reactions to olefins and diolefins.

The following example illustrates the practice of the present process using a reactor which has been pressured-up with carbon monoxide prior to carrying out the isomerization reaction.

EXAMPLE 2

The conditions employed in Example 1 are generally the same except that the autoclave is prepressured with 170 p.s.i.g. carbon monoxide before heat-up is started. The reaction mixture is then heated, the temperature being maintained at 200° C. for 1 hour. When the pressure is observed to rise to 270 p.s.i.g., it is reduced in 25 p.s.i.g. increments every 15 minutes to 50 p.s.i.g. The product obtained analyzes 92.2% 1,3-cyclooctadiene; 1.8% 1,4-cyclooctadiene; 2.5% 1,5-cyclooctadiene; 1.5% back flush; 2.0% other.

The following example illustrates the use of a constant carbon monoxide pressure in the conversion of 1,5-cyclooctadiene to 1,3-isomer.

EXAMPLE 3

A series of isomerization reactions are conducted by heating 1,5-cyclooctadiene to reaction temperature in an autoclave under a constant carbon monoxide pressure of 40 p.s.i.g. Iron pentacarbonyl catalyst is then introduced into the autoclave from a small bomb under carbon monoxide pressure. Reaction time is commenced upon introduction of the catalyst. Pressure is maintained at a constant 40 p.s.i.g. by use of a preset "pop-off" valve.

The reaction conditions and product analyses are presented in Table 1, below:

TABLE 1

| Run | Cat. Conc. (percent) | Temp. (° C.) | Time (hr:min.) | 1,3-Cyclo-octadiene Selectivity (percent) |
|---|---|---|---|---|
| 121 | 1 | 190 | 6:00 | 98.3 |
| 122 | 1 | 140 | 5:40 | 98.1 |
| 127 | 1 | 200 | 4:29 | 97.0 |
| 123 | 2 | 190 | 5:00 | 95.9 |

To study the effect of carbon monoxide pressure on reaction rate and product yield at constant temperature, the following experiment was conducted:

EXAMPLE 4

Using the same procedure as in Example 3, 1,5-cyclooctadiene is converted to 1,3-cyclooctadiene at various carbon monoxide pressures. Samples are taken from the autoclave at predetermined intervals and analyzed by gas chromatography. The reaction conditions and results are as follows:

TABLE 2

| Run | Temp. (° C.) | CO part. press. (p.s.i.g.) | Fe(CO)$_5$ conc. (percent) | Time (min.) | 1,3-Cyclooctadiene (percent of sample) | Conc. of Fe(CO)$_5$ (percent of sample) |
|---|---|---|---|---|---|---|
| A-1 | 190 | 15 | 1.56 | 2 | 36.0 | 0.13 |
| 2 | | | | 15 | 79.5 | 0.02 |
| 3 | | | | 30 | 91.0 | 0.02 |
| 4 | | | | 60 | 94.3 | 0.03 |
| 5 | | | | 120 | 94.0 | 0.02 |
| 6 | | | | 180 | 94.0 | 0.02 |
| 7 | | | | 240 | 94.5 | 0.01 |
| 8 | | | | 300 | 93.9 | 0.01 |
| B-1 | 190 | 50 | 1.68 | 1 | 7.3 | 0.50 |
| 2 | | | | 10 | 25.2 | 0.46 |
| 3 | | | | 25 | 38.5 | 0.33 |
| 4 | | | | 55 | 54.5 | 0.23 |
| 5 | | | | 115 | 72.4 | 0.15 |
| 6 | | | | 175 | 82.6 | 0.16 |
| 7 | | | | 203 | 84.5 | 0.16 |

The above data show that with increasing carbon monoxide pressure at a constant reaction temperature, the rate of conversion of 1,5-cyclooctadiene to 1,3-cyclooctadiene is reduced, due to the fact that the rate of decomposition of iron pentacarbonyl catalyst is reduced. If the carbon monoxide pressure is maintained at a value greater than that which will inhibit the decomposition of iron pentacarbonyl, the yield of isomer product is drastically reduced: this is illustrated by the following comparative example.

EXAMPLE 5

Cyclooctadiene-1,5 is brought to a reaction temperature of 130° C. in an autoclave in a carbon monoxide atmosphere at a pressure of 500 p.s.i.g. Iron pentacarbonyl catalyst (1.5% by weight of 1,5-cyclooctadiene) is then introduced under carbon monoxide pressure into the autoclave. The reaction pressure (i.e. partial pressure of CO) is maintained at a constant 500 p.s.i.g., which is assumed to be sufficient at a reaction temperature of 130° C. to inhibit decomposition of the iron pentacarbonyl catalyst. After a total reaction time of 5 hours and 25 minutes, the reaction mixture is removed from the autoclave and analyzed by gas chromatography. The amount of the desired 1,3-cyclooctadiene in the mixture is found to be nil.

The following example, also presented for purposes of comparison with the present invention, illustrates an isomerization reaction carried out in the absence of carbon monoxide pressure.

EXAMPLE 6

A mixture of 1,5-cyclooctadiene (500 grams) and iron pentacarbonyl (5 grams) is placed in a three-neck round bottom flask fitted with a thermometer, reflux condenser and sample tube. The reactor system is wrapped with aluminum foil to protect it from light and blanketed with argon to protect it from air. After refluxing the reaction mixture at a temperature of 154° C. for 51 hours 43 minutes, the yield of desired 1,3-cyclooctadiene is only 27.3%.

EXAMPLE 7

Cyclododecadiene-1,5 is heated with iron pentacarbonyl (1.5%) to a reaction temperature of 200° C. in the absence of air. The partial pressure of carbon monoxide is observed to rise to 85 p.s.i.g. after one hour and seven minutes of heating, and is held at that value for another one hour and forty-three minutes. The partial pressure is then reduced by 5 p.s.i.g. increments every eleven mintutes to a final pressure of 15 p.s.i.g. The reaction mixture is cooled and found to contain 94% of the desired 1,3-isomer of cyclododecadiene.

EXAMPLE 8

Following the general procedure of Example 3, a mixture of 89% cis-11% trans cyclooctene-1 is converted to a mixture of 98% cis-2% trans cyclooctene-1 in about 4½ hours at a temperature of 160° C. and a constant CO partial pressure of 20 p.s.i.g. using Co$_2$(CO)$_8$ in a concentration of 1.5% as the catalyst.

EXAMPLE 9

Cyclononadiene-1,3 is heated with dicobalt octacarbonyl (2.0%) to a reaction temperature of 180° C. in an autoclave evacuated of air. The partial pressure of carbon monoxide reaches 60 p.s.i.g. after 1 hour and 10 minutes of heating, after which it is reduced in 5 p.s.i.g. increments every 15 minutes to a final pressure of 15 p.s.i.g. A high yield of 1,5-cyclononadiene is obtained. Cyclononadiene-1,5 in a yield of approximately 50% is obtained.

It will, of course, be understood that various changes may be made in the embodiments which have been referred to above to describe the invention without departing from the spirit and scope of the invention as expressed in the appended claims. For instance, the carbon monoxide atmosphere in which the isomerization reaction is conducted can contain inert diluents, such as carbon dioxide, nitrogen and the like. Furthermore, the heavy metal carbonyl catalyst may be prepared in situ from the metal carbon monoxide.

We claim:
1. Isomerization process comprising contacting a multi-unsaturated aliphatic hydrocarbon with from about 0.1 to about 10%, based on the weight of said hydrocarbon, of a Group VIII metal carbonyl compound and decomposing said carbonyl compound at a temperature of from about 90° to about 300° C. under a carbon monoxide pressure of from about 5 to about 400 p.s.i.g., said hydrocarbon being selected from the group consisting of ethylenically unsaturated acyclic hydrocarbons and ethylenically unsaturated alicyclic hydrocarbons containing from about 6 to about 12 carbon atoms.

2. Process for isomerizing a cycloaliphatic hydrocarbon containing at least two ethylenic double bonds positioned in a ring of from about 6 to about 12 carbon atoms which comprises contacting said hydrocarbon with from about 0.5 to about 2%, based on the weight of the hydrocarbon, of a Group VIII metal carbonyl compound and decomposing said carbonyl compound at a temperature of from about 90° C. to about 300° C. in a carbon monoxide atmosphere of from about 5 to about 400 p.s.i.g.

3. Process as in claim 2 wherein said Group VIII metal carbonyl compound is a carbonyl of a metal selected from the group consisting of iron and cobalt.

4. Process as in claim 3 wherein said metal carbonyl is iron pentacarbonyl.

5. Process as in claim 3 wherein said metal carbonyl is decomposed under a carbon monoxide pressure of from about 15 to about 100 p.s.i.g.

6. Process for isomerizing a cycloaliphatic diene hydrocarbon compound containing both ethylenic double bonds positioned in a ring of from about 6 to about 12 carbon atoms, the double bonds being separated from each other by at least one hydrogen-bearing ring carbon atom, which comprises contacting said hydrocarbon with from about 0.5 to about 2%, based on the weight of said hydrocarbon, of a carbonyl of a metal selected from the group consisting of iron and cobalt and decomposing said carbonyl compound at a temperature of from about 130° C. to about 250° C. in a carbon monoxide atmosphere of from about 15 to about 50 p.s.i.g.

7. Process for the production of 1,3-cyclooctadiene which comprises contacting 1,5-cyclooctadiene with from about 0.8 to about 1.5%, based on the weight of 1,5-cyclooctadiene, of iron pentacarbonyl and decomposing said iron pentacarbonyl at a temperature of from about 130° C. to about 250° C. in a carbon monoxide atmosphere of from about 15 to about 50 p.s.i.g.

References Cited
UNITED STATES PATENTS 3,083,246 3/1963 Holzman _____ 260—683.15
3,270,071 8/1966 Mueller et al. _____ 260—666

OTHER REFERENCES

J. E. Arnet et al.: J. Amer. Chem. Soc., 83, pages 2954–2955, 1961.

T. A. Manuel et al.: Chem. and Ind., pages 1349–1350, 1959.

DELBERT E. GANTZ, *Primary Examiner.*

V. O'KEEFE, *Assistant Examiner.*